May 27, 1941.   J. A. V. BENARD   2,243,788
DEVICE FOR LIGHTING OPERATING ROOMS
Filed July 12, 1939   9 Sheets-Sheet 5

Inventor
Jacques A. V. Benard
by Wilkinson & Mawhinney
Attorneys.

May 27, 1941.   J. A. V. BENARD   2,243,788
DEVICE FOR LIGHTING OPERATING ROOMS
Filed July 12, 1939   9 Sheets-Sheet 7

Inventor
Jacques A. V. Benard
by Wilkinson & Mawhinney
Attorneys.

Patented May 27, 1941

2,243,788

UNITED STATES PATENT OFFICE 2,243,788

DEVICE FOR LIGHTING OPERATING ROOMS

Jacques Alfred Victor Benard, Paris, France, assignor to Anciens Etablissements Barbier, Benard & Turenne, Paris, France, a joint stock company of France Application July 12, 1939, Serial No. 284,112
In France July 29, 1938

2 Claims. (Cl. 240—1.4)

The present invention relates to improvements in the lighting of operating rooms, with complete separation of the lighting source, thereby providing the possibility of effecting the complete sterilization of the air of the room.

The invention is essentially characterized by the fact that a transparent false ceiling, arranged at a certain distance below the ceiling proper, forms, at the upper part of said room, a separated space in which a lighting apparatus can move horizontally and be directed so as to enable the operation table to be illuminated at various points and under variable angles.

A first embodiment of the invention enables this lighting to be obtained without requiring operating rooms of great height while permitting of vertical lighting for normal operations and oblique lighting, for example for gynaecological operations.

This embodiment is essentially characterized by the fact that the lighting apparatus can be moved horizontally above a transparent false ceiling, and in an accentuated oblique direction which enables it to be brought to any desired height, behind an oblique transparent partition which forms an extension of the above mentioned transparent false ceiling.

The lighting apparatus is mounted on a forked support adapted to pivot on a carriage which moves on a horizontal roller track, means being provided whereby the first part of the horizontal movement of the carriage results in a horizontal movement of the lighting apparatus, above the transparent false ceiling, whereas the last part of this horizontal movement results in a pivoting of the forked support and an oblique downward movement of said apparatus, behind the oblique transparent partition.

Said means consist of a guide-way in which is engaged a roller carried by the forked support and which comprises a horizontal portion and an inclined portion.

According to another feature, the lighting apparatus is mounted on the forked support in such a manner that it can pivot between predetermined limits, thereby enabling the direction of the luminous beam to be adjusted both when the apparatus is in its high position above the transparent ceiling and when it is in its low lateral position, behind the transparent partition.

The translatory movement of the carriage and the swinging movement of the lighting apparatus may advantageously be controlled from a distance by means of any appropriate mechanical, electric, cable, etc. mechanism.

The invention also covers another embodiment according to which the lighting apparatus is directly mounted on the carriage in such a manner that it can be angularly adjusted within very wide limits, thereby enabling, by means of an adjustment of the horizontal position of the carriage and an adjustment of the angular position of the lighting apparatus on said carriage, the lighting of any point of the room to be obtained at the desired incidence.

The control of the movement of the carriage and the control of the angular movement of the lighting apparatus may advantageously be effected from a distance by electric means, the carriage in this case carrying a first motor adapted to control its horizontal movement and a second motor adapted to control the angular movement of the lighting apparatus, switches placed within the operator's reach enabling him to start said motors or to stop same.

According to a feature of the invention, the operation of the two motors is entirely independent, so that the operator can act on any one of said motors or on both simultaneously, so as to obtain at the same time the translatory and the directional movements of the lighting apparatus in order, for example, to maintain the centering of the lighting at a predetermined point, while varying the incidence of the illuminating beam.

According to the invention, on either side of the transparent false ceiling, galleries may advantageously be provided in which students may sit and be directly present at the operations without however being in the room itself.

An opaque screen separates said galleries from the zone in which the lighting apparatus can move, in order to prevent any dazzling of the people located in said galleries.

The invention can be applied with any type of appropriate lighting apparatus. It is possible, for example, to use lighting apparatus which do not cast a shadow, of the type of those comprising a central luminous source surrounded by an optical system (for example, Fresnel ring) which directs the luminous rays issuing from the source, towards a multiple facet conical annular reflector.

According to the invention, such a lighting apparatus may advantageously be provided with an emergency lighting system comprising a plurality of projectors fixed on the frame of the apparatus and the luminous beams of which are concentrated on the zone to be illuminated.

Said apparatus may also be provided with an anti-calorific ground glass which as arranged below the luminous source and which, by catching the direct rays of the bulb, which are not refracted by the optical system, prevents any violent contrast between the luminous zone and the adjacent regions.

Other features and peculiarities of the invention will become apparent from the ensuing description thereof made with reference to the accompanying drawings which show diagrammatically and merely by way of example, two embodiments of the invention.

Figure 1:
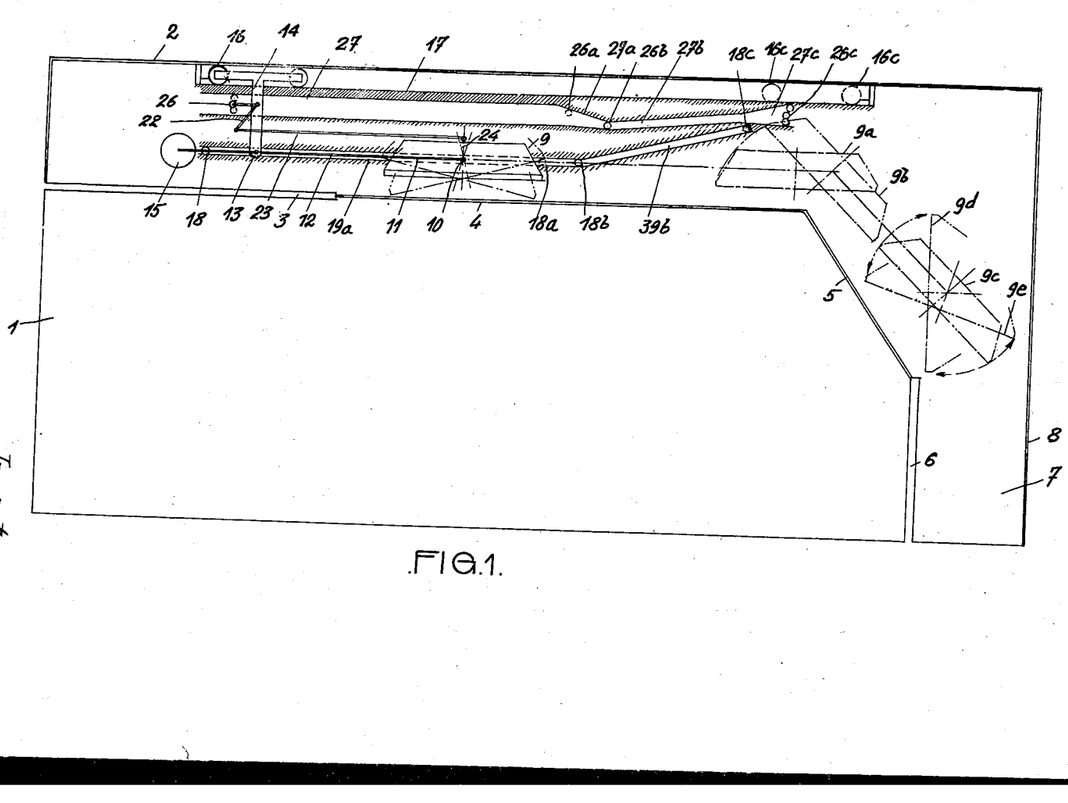
Fig. 1 is an elevational view of an operating room provided with a lighting apparatus according to the invention which lighting apparatus is shown very diagrammatically in the various positions it can occupy.

In Fig. 1, there has been very diagrammatically shown an operating room 1 which is provided with a lighting device according to the invention and the normal ceiling 2 of which may be located at a normal height. Said operating room is provided with a false ceiling 3 which contains a horizontal transparent portion 4 to which is joined a likewise transparent oblique partition 5 which is itself joined to a lateral partition 6. A passage 7, in which can stand the assistant who is to control the lighting apparatus, is provided between said partition 6 and the corresponding wall 8.

Figure 2:
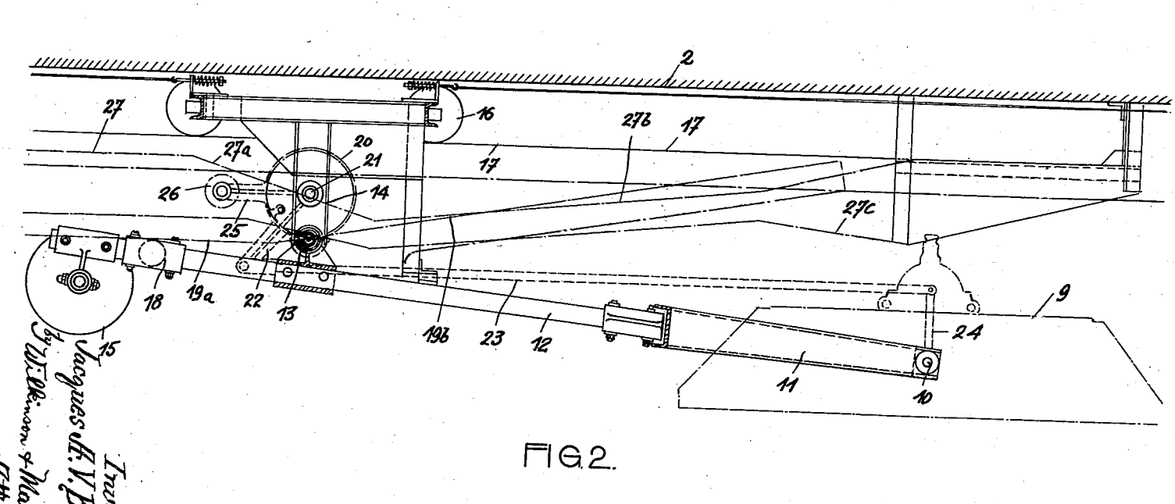
Fig. 2 shows, on a larger scale, the mounting device of the lighting apparatus.
Figures 4, 7:
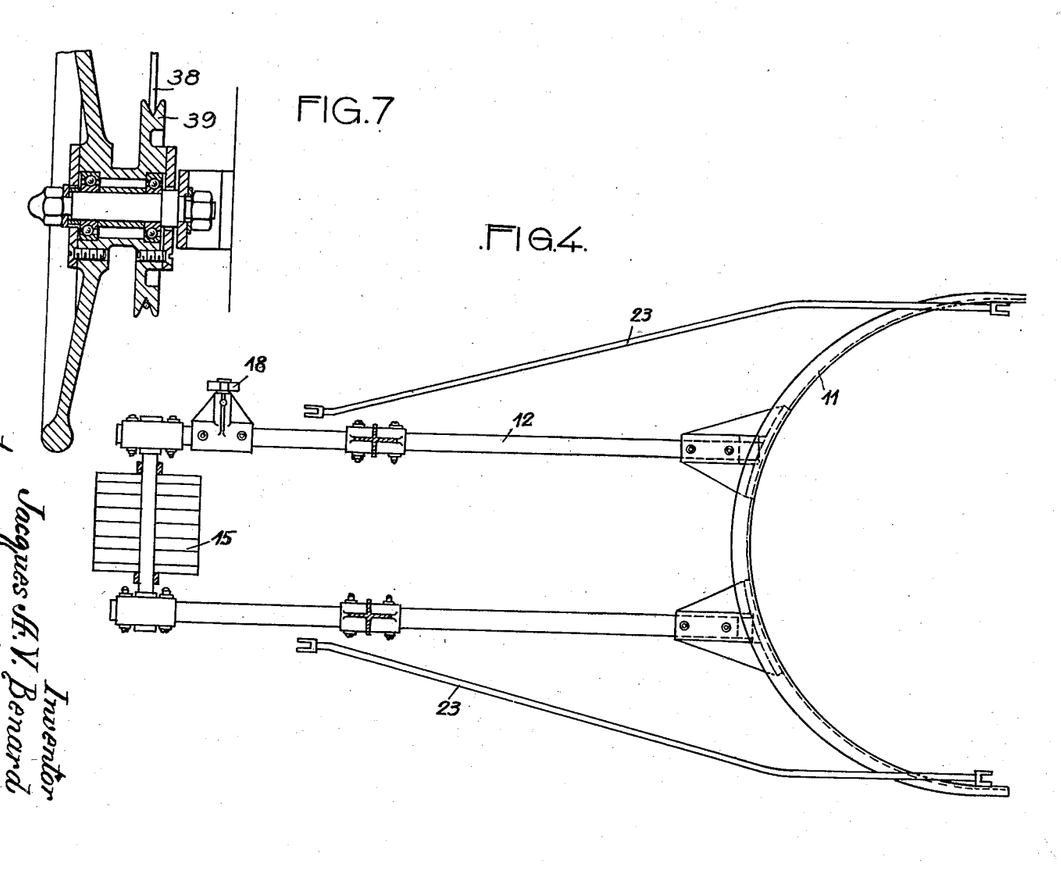
Fig. 4 shows a plan view of the forked support supporting the lighting apparatus.
Fig. 7 shows a section on a larger scale of the control wheel for the inclining movement.

The lighting apparatus is shown diagrammatically at 9. It comprises two diametrically opposite journals 10 supported by the ends of a forked support 11 (see Figs. 2 and 4) whereof the two arms 12 can pivot about a spindle 13 carried by a carriage 14. At their opposite end, said arms 12 are subjected to the action of a counterweight 15 which enables the lighting apparatus to be balanced. The carriage 14, which may be constructed in any appropriate manner, is provided with rollers 16 which can move along a horizontal roller track 17 supported for example by the ceiling 2.

Figure 3:
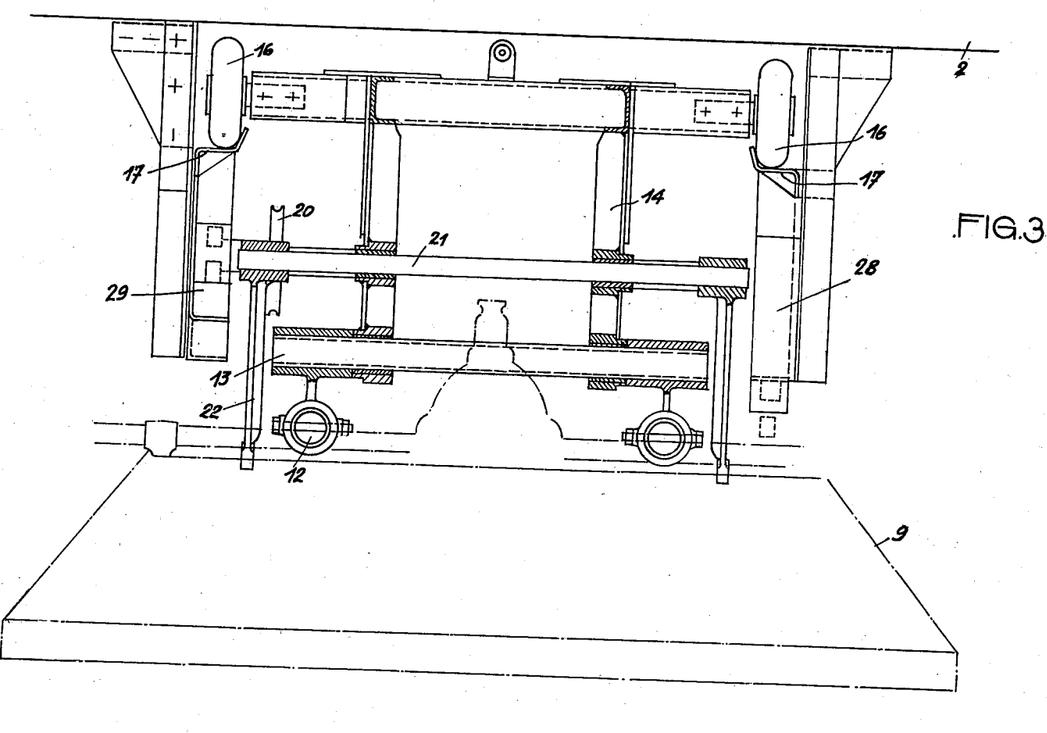
Fig. 3 is the corresponding side view.

On one of the arms 12 of the support 11, is mounted a roller 18 which co-operates with a guide-way formed by a substantially horizontal part 19a followed by an inclined part 19b. Said guide-way is advantageously provided in a hanging lateral wall 28 (Fig. 3). As will be seen hereinafter, this arrangement will enable the lighting apparatus, on the one hand to be moved horizontally above the transparent false ceiling 4, and on the other hand to be brought into its lowest position behind the oblique transparent partition 5.

This lighting apparatus 9 can also effect a slight swinging movement about its journals 10, in order to enable the luminous beam to be directed within certain limits. Said swinging movement is imparted to it by the angular movement of a drum 20 (Fig. 5) which is rotatable about a spindle 21 carried by the carriage. Said drum 20 is rigidly secured to a lever 22 which can control the swinging of the apparatus 9 by means of the rod 23 and of the link 24. It will be seen hereinafter how the angular movement of the drum 20 may be controlled from a distance, as may moreover the horizontal movement of the carriage 14.

To the drum 20 is also rigidly secured a second lever 25, at the end of which is mounted a roller 26 engaged in a guide-way 27 provided in a second hanging lateral wall 29 (Fig. 3). As can be seen more particularly in Fig. 1, said guide-way is sufficiently wide for the roller to be able to effect the angular movements which are imparted to it when it is desired to swing the apparatus 9 about its journals. Said guide-way 27 comprises a horizontal portion 27 followed by an inclined slope 27a which is itself followed by an inclined portion 27b which terminates in a widened portion 27c.

By means of the arrangement which has just been described, the lighting apparatus 9 can be readily brought from its high position above the false ceiling 4, and which is suitable for normal operations, to its position 9c, behind the oblique partition 5, which is suitable for gynaecological operations. This arrangement operates in the following manner: When, starting from the position 9 shown in Fig. 1, it is desired to bring the apparatus into the position 9c, it suffices to move the carriage 14 along its roller track 17. At the beginning of this movement, the roller 18 moves in the horizontal portion 19a of its guide-way; the support 11—12 moves horizontally, together with the lighting apparatus 9. When the roller 18 reaches the position 18a, the roller 26, for its part, reaches its position 26a. At this instant, the apparatus 9 is in the position 9a; it is still horizontal. When the carriage continues to move, the slope 27a acts on the roller 26a and consequently swings the apparatus 9 which, when the roller 18 reaches its position 18b and the roller 26 its position 26b, is then in a position 9b, the support 11—12 having remained parallel with itself. If the movement of the carriage 14 then continues, the roller 18 rolls up along the inclined track 19b. It then causes the support 11—12 to swing about its spindle 13, so that when said roller 18 reaches the position 18c, the lighting apparatus is finally in the position 9c, the inclined portion 27b of the upper guide-way having caused said apparatus to effect a swinging movement in the opposite direction to that which had been caused by the slope 27a, in order to return the support and the lighting apparatus to their normal relative position.

It can moreover be seen that to the extreme position 18c of the roller 18 there corresponds a widened portion 27c of the guide-way for the roller 26 which can occupy at 26c different positions to which correspond positions of the lighting apparatus between two limit positions 9d and 9e.

It will therefore be seen that by simply moving the carriage 14, a horizontal movement can easily be imparted to the lighting apparatus, above the transparent ceiling 4, so as to bring it right above the operating table, or to bring it into its position 9c for gynaecological operations.

The translatory movement of the carriage 14, and also the swinging movement of the apparatus 9 about its journals, may be controlled from a distance, for example by an assistant who is placed in the actuating passage 7. Any appropriate remote control device may be provided for this purpose and it is only by way of an example which is in no way limitative, that an embodiment of a remote control mechanism has been shown in the accompanying drawings and in particular in Figs. 5 to 8.

Figure 5:
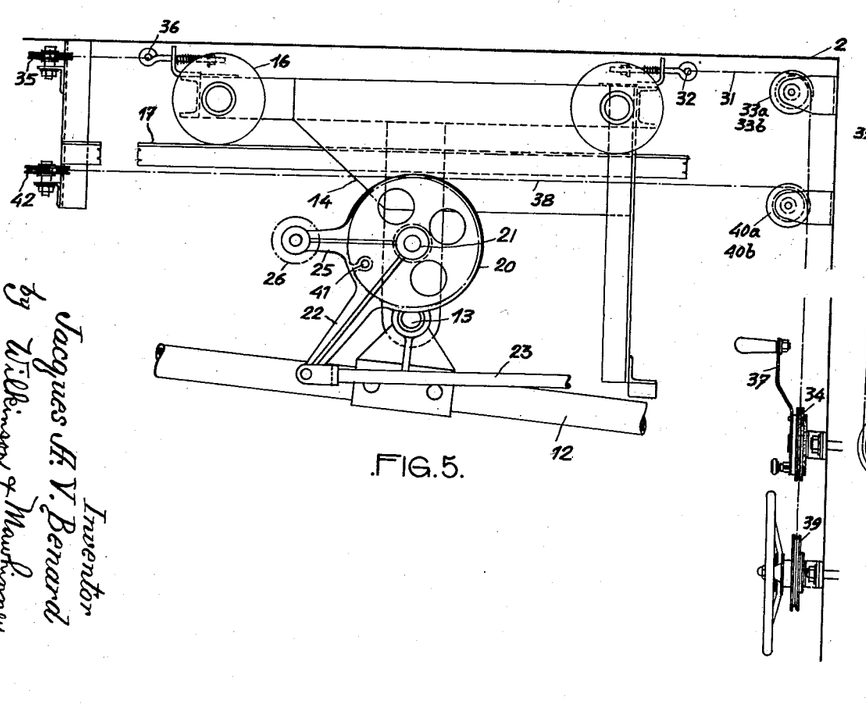
Fig. 5 shows the remote control device for the two possible movements of the lighting apparatus.
Figure 6:
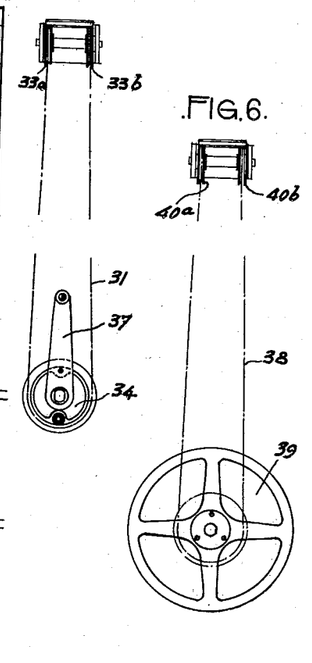
Fig. 6 is the corresponding side view, showing only the control wheels.

According to this embodiment, the translatory movement of the carriage 14 is controlled by a cable 31 which is secured at 32 to one side of the carriage, passes over a guide roller 33a on the control wheel 34, returns and passes over a guide roller 33b, then over a horizontal guide roller 35 and is finally secured at 36 to the other side of the carriage 14. It will immediately be understood that when the hand-wheel 34 is rotated by means of a crank 37, the carriage 14 is moved in one direction or in the other.

Similarly, the swinging movement of the apparatus 9 about its journals 10 is controlled by an endless cable 38 which passes over a control wheel 39, over a guide roller 40a, winds round the drum 20 to which it is secured at 41, then passes over a horizontal guide roller 42, then over a guide roller 40b and returns to the control wheel 39. When said wheel is rotated, the cable 38 causes the angular movement of the drum 20 and consequently the swinging of the apparatus 9 through the intermediary of the system of levers 22, 23, 24.

In order to prevent, when the hand-wheel 39 is actuated, causing not only the desired swinging movement of the apparatus 9 but also an untimely translatory movement of the carriage 14, the hand-wheel 34 can be locked by means of a spring plunger which is designated in a general manner by 43 (Fig. 8) and is of well known construction. Said plunger 43 is brought into locking position when the hand-wheel 39 is actuated, it is brought into the unlocked position when the hand-wheel 34 is to be actuated.

It will furthermore be observed that the cable system such as 38 which has been described, with its fixing at 41 on the drum 20, enables the translatory movement of the carriage 14 to be produced without thereby causing a relative angular movement of said drum 20. During the translatory movement of said carriage 14, the hand-wheel 39 will rotate freely but the lighting apparatus 9 will not effect any swinging movement.

Instead of being arranged in the passage 7 as stated above, the crank 37 and the hand-wheel 39 controlling the two movements may be against the partition 6, inside the operating room.

According to the invention, any appropriate lighting apparatus may be used. It is possible, for example, to use a shadowless lighting apparatus, of the type known by the trade-mark "Scialytique" and which comprises a central luminous source, a Fresnel ring around said source, and a multiple facet conical annular reflector.

Said shadowless lighting apparatus may advantageously be provided with an emergency lighting system comprising a number of auxiliary projectors fixed on its actual frame and the convergent luminous beams of which give a shadowless lighting even for this emergency lighting.

On the other hand, below the luminous source of this lighting apparatus, is arranged a ground glass disc which enables all the direct rays of the bulb that are not refracted by the Fresnel ring to be utilized. Said disc, which may be made of anti-calorific glass, thus produces a general lighting effect and contributes to prevent any violent contrast between the luminous zone and the adjacent outer regions on the operating field.

Finally, the guiding device according to the invention offers the advantage of avoiding any danger of the glazing being struck by the cupola since the slopes of same and of the forked support are imperatively limited.

In Figs. 9 to 12, a second embodiment has been shown. As in the previous embodiment, the operating room 1 is provided, below its ordinary ceiling 2, with a transparent false ceiling 3 which thus determines a zone 1a which is isolated from the operating room 1 and in which can move the lighting apparatus 9 carried by a carriage 14, the rollers 16 of which can move on rails or other roller tracks 17.

Figure 12:
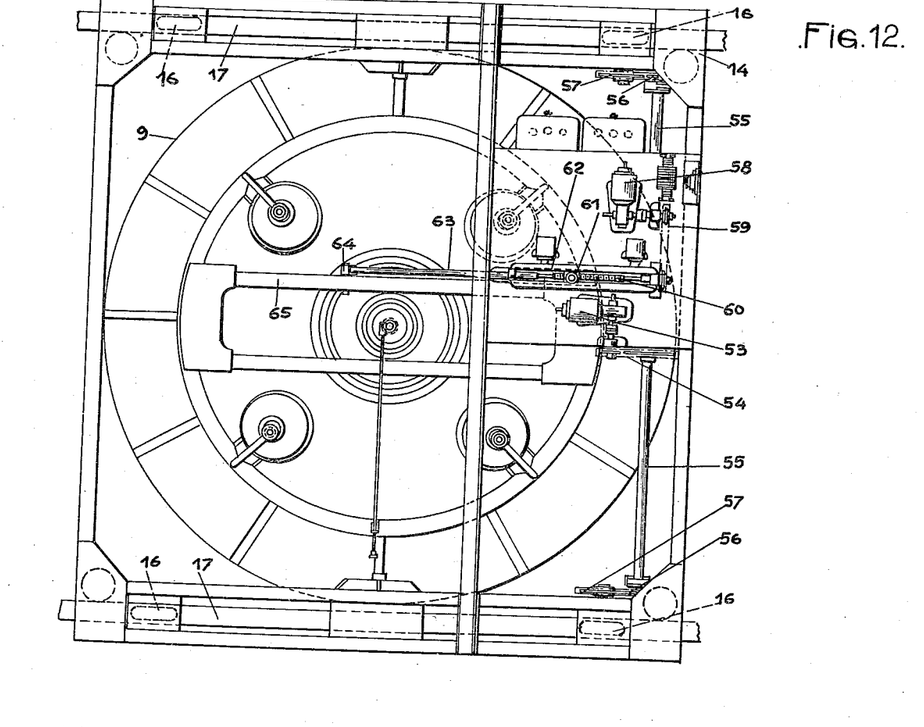
Fig. 12 is a plan view, on a larger scale, of the lighting apparatus and of the carriage on which it is mounted.

According to this second embodiment and differently from the previously described arrangement, the lighting apparatus 9 pivots directly, by means of journals 50, on brackets 51 secured to the carriage 14. This lighting apparatus 9 has a great freedom of angular movement, that is to say that it can swing about its journal 50 within very wide limits.

This possibility of directing within very wide limits the luminous beam emitted by said apparatus 9, combined with the possibility of horizontal movement of the rails 17, enables any point of the operating room to be illuminated at the desired incidence.

According to the invention, the translatory movement of the carriage 14 and the directing movement of the apparatus 9 may be controlled from a distance and, in the example shown in the drawings, it has been assumed that this double control was obtained electrically. For this purpose, and as more particularly shown in Fig. 12, the carriage 14 carries a first electric motor 53 which, through the intermediary of a transmission shown diagrammatically at 54, drives the transverse shaft 55 on the two ends of which are fixed pinions 56 which, by means of sprocket-chains 57, respectively drive the two corresponding rollers 16 of the carriage, the two other rollers of same being simply supporting rollers, when the motor 53 is set in motion in one direction or in the other, it therefore causes the translatory movement of the carriage and, consequently, of the apparatus 9 in one direction or in the other.

For controlling the directing movement of the apparatus 9 about its journals 50, the carriage 14 carries a second motor 58 which, through the intermediary of an appropriate transmission generally designated by 59, imparts a rotary movement to a worm 60 which is stationary longitudinally and on which is mounted a nut 61 which is prevented from rotating but which can move longitudinally along a slideway 62. On said nut 61 is pivotally mounted the end of a connecting rod 63, the other end 64 of which is pivoted on the frame 65 provided at the upper part of the apparatus 9. It will thus be immediately understood that when the motor 58 is set in motion in one direction or in the other, it imparts a movement to the nut 61 in the corresponding direction; the connecting rod 63 then effects the angular movement of the apparatus 9 about its journals 50 in the corresponding direction.

The supply wires for the lighting source of the apparatus 9 and the supply wires for the two motors 53 and 58 are grouped together so as to form a single cable 66 which passes over a fixed roller 67, then over a movable roller 68 having a counterweight 69, and finally terminates at a connecting-box 70 from which extend wires connected to the remote control switches shown at 71. It has been assumed that these controlling switches were formed by push button switches which close the corresponding circuit so long as they are kept depressed. In this case it is necessary to provide two buttons for each motor. When one of said two buttons is depressed, the corresponding motor is set in motion in one direction and when the other button is depressed, it is set in motion in the opposite direction. The motor is normally at rest when neither button is depressed. When either button is depressed the motor starts, when released, the motor stops. From the box 70, there also extend wires connected to the switch which enables the lighting source of the apparatus 9 to be lit or extinguished.

It can be seen that the two motors 53 and 58 are entirely independent of each other. The operator can therefore at will actuate one or the other of said motors or actuate them simultaneously. Said operator can thus control at the same time the longitudinal movement of the carriage 14 and the direction of the apparatus 9 in order to maintain, for example, the centring of the lighting at a predetermined point, while varying the incidence of the luminous beam.

Figure 11:
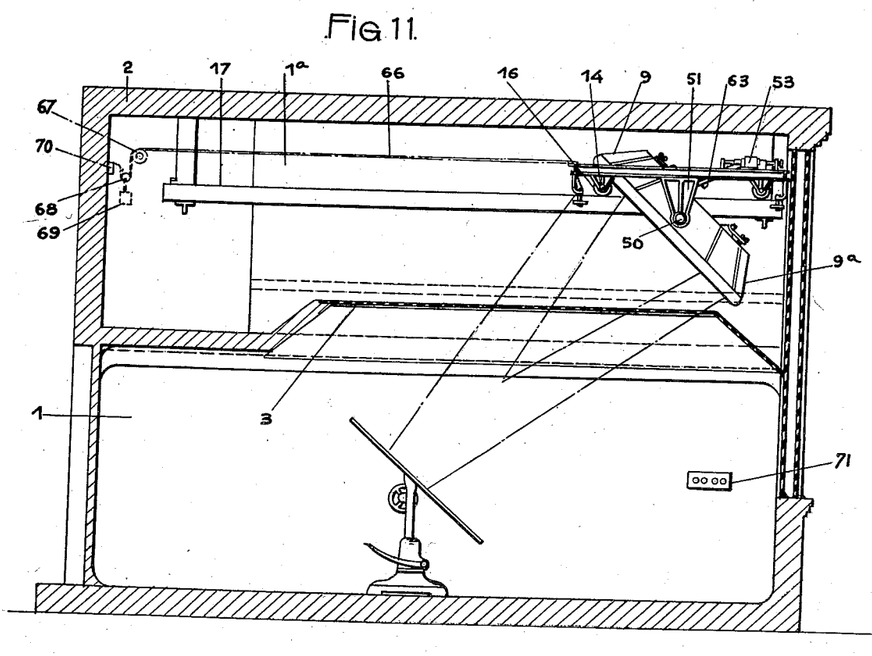
Fig. 11 is a similar view to that of Fig. 9 but in which the lighting apparatus occupies a different position from the one it occupies in said Fig. 9.

The apparatus can, in particular, be brought into the extreme position shown at 9a in Fig. 11. In this position, said apparatus gives a lighting at a very accentuated incidence which is particularly suitable for gynaecological operations.

Figures 8, 9:
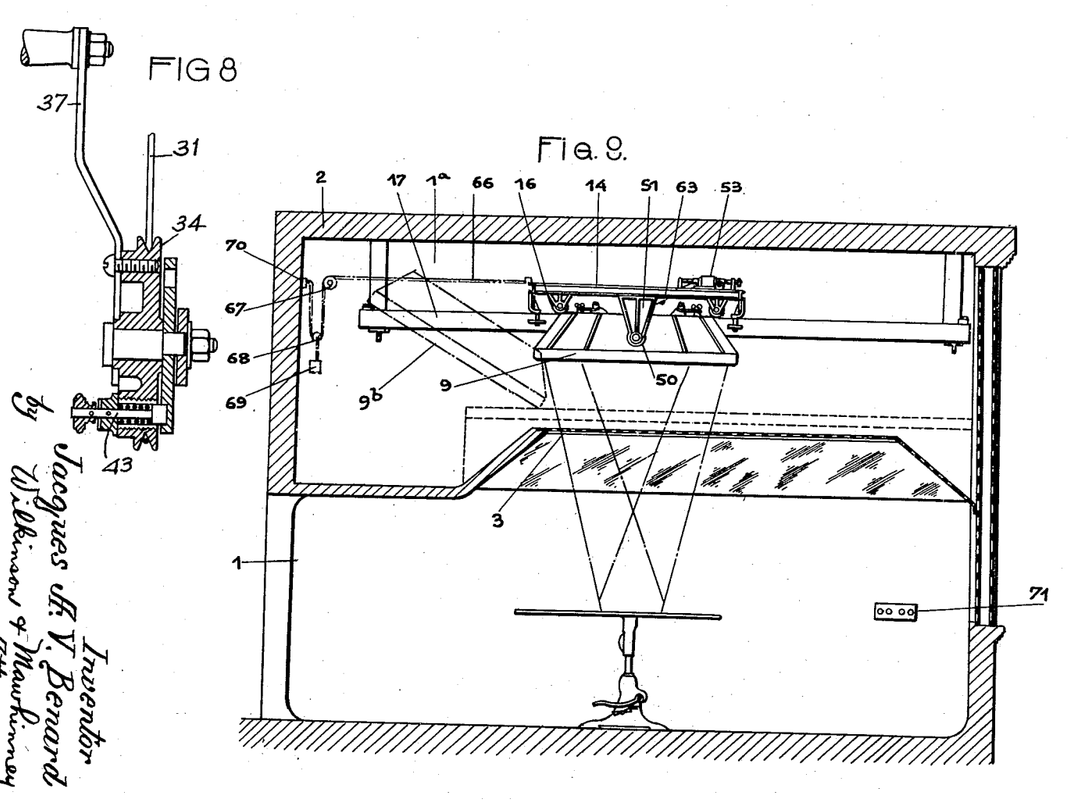
Fig. 8 shows the control wheel for the translatory movement of the carriage.
Fig. 9 is a longitudinal sectional view of an operating room provided with a lighting equipment according to the second embodiment of the invention.

For its up-keep, the apparatus may advantageously be brought into the position shown in dotted lines at 9b in Fig. 9.

As it is apparent from the foregoing explanations, the invention offers an interesting advantage as regards installation. In fact, the architect only has to deal with the fixing of the roller track 17. Once said roller track is in position, it suffices to bring up the completely assembled apparatus and place it on said track.

As can be seen more particularly in Fig. 12, the lighting apparatus 9, which is of the shadowless lighting type provided with an annular reflector surrounding the central lighting source, is completely open at the top thereof, which enables the whole arrangement to be ventilated more readily.

Figure 10:
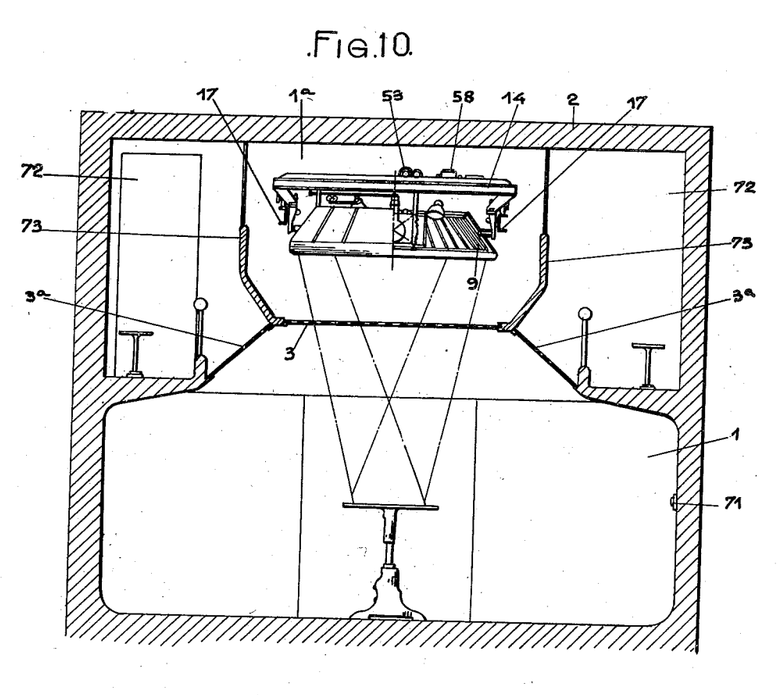
Fig. 10 is a transverse sectional view of this same room.

Finally, according to the invention, as can be more particularly seen in Fig. 10, the transparent false ceiling 3 is of a special cross-section which enables galleries 72 to be arranged on each side of said ceiling, in which galleries students can sit who can thus directly follow the operations which are taking place in the room 1. For this purpose, the false ceiling 3 proper is extended on each side by oblique glass partitions 3a through which the people in the galleries 72 look. Said glass partitions 3a are made of very clear glass, thus permitting of very distinct vision; on the contrary, the false ceiling proper 3 is made of figured glass which, while being transparent, nevertheless to a certain extent hides the whole apparatus and carriage. In order to prevent the people in the galleries 72 from being dazzled by the light emitted by the apparatus 9, opaque partitions or screens 73 are interposed between each of said galleries 72 and the zone in which said apparatus 9 moves.

It is moreover obvious that the invention has only been described and illustrated in an explanatory and in no way limitative manner and that modifications of detail may be made therein without altering its spirit.

I claim:

1. Lighting equipment for operating rooms, with complete separation of the lighting source, comprising a transparent false ceiling consisting of a horizontal portion in spaced relationship to the ceiling proper and an oblique portion inclined downward and located at one end of said horizontal portion, a horizontal roller track located in the separated space thus formed above the false ceiling, a carriage adapted to be moved on said roller track, a lighting apparatus connected to said carriage and movable therewith, means for controlling the horizontal movement of said carriage on the roller track, and means whereby the first part of said movement of the carriage imparts a horizontal movement to the lighting apparatus above the horizontal false ceiling portion, whereas the last part of such horizontal movement results in a pivoting of the lighting apparatus and in an oblique downward movement of same behind the oblique false ceiling portion.

2. Lighting equipment for operating rooms, according to claim 1, in which the lighting apparatus can pivot on a forked support adapted to pivot on the carriage and which is provided with a roller engaged in a guide-way comprising a horizontal portion in which said roller moves during the first part of the horizontal movement of the carriage, and an oblique portion in which said roller moves during the last part of said horizontal movement of the carriage, thereby causing the forked support to pivot relatively to the carriage and therefore the lighting apparatus to also pivot and to move downwardly and obliquely.

JACQUES ALFRED VICTOR BENARD.